(12) United States Patent
Usui

(10) Patent No.: US 7,346,450 B2
(45) Date of Patent: Mar. 18, 2008

(54) VEHICLE NAVIGATION APPARATUS FOR CONTROLLING MAP-MATCHING AREAS

(75) Inventor: Yoshimasa Usui, Nagoya (JP)

(73) Assignee: DENSO CORPORATION, Kariya (JP)

( * ) Notice: Subject to any disclaimer, the term of this patent is extended or adjusted under 35 U.S.C. 154(b) by 759 days.

(21) Appl. No.: 10/817,917

(22) Filed: Apr. 6, 2004

(65) Prior Publication Data

US 2004/0204827 A1 Oct. 14, 2004

(30) Foreign Application Priority Data

Apr. 8, 2003 (JP) ............................. 2003-104397

(51) Int. Cl.
*G01C 21/00* (2006.01)

(52) U.S. Cl. .................. 701/201; 701/205; 701/208; 701/221; 701/211; 701/214

(58) Field of Classification Search ............... 701/205, 701/208, 210, 211, 214; 340/995.25
See application file for complete search history.

(56) References Cited

U.S. PATENT DOCUMENTS

| | | | |
|---|---|---|---|
| 5,469,360 A * | 11/1995 | Ihara et al. ................ | 701/208 |
| 5,471,393 A * | 11/1995 | Bolger ....................... | 701/217 |
| 5,598,339 A | 1/1997 | Yoshihara et al. | |
| 5,752,219 A | 5/1998 | Yoshihara et al. | |
| 5,948,043 A * | 9/1999 | Mathis ....................... | 701/208 |
| 6,026,346 A * | 2/2000 | Ohashi et al. .............. | 701/210 |
| 6,263,276 B1 * | 7/2001 | Yokoyama et al. ......... | 701/207 |
| 6,356,837 B1 * | 3/2002 | Yokota et al. .............. | 701/208 |
| 6,453,235 B1 * | 9/2002 | Endo et al. ................. | 701/211 |
| 6,519,528 B2 * | 2/2003 | Endo et al. ................. | 701/211 |
| 6,574,550 B2 * | 6/2003 | Hashida ...................... | 701/207 |
| 6,937,935 B2 * | 8/2005 | Sato ........................... | 701/207 |
| 2002/0072849 A1 * | 6/2002 | Endo et al. ................. | 701/211 |
| 2002/0169544 A1 * | 11/2002 | Hashida ...................... | 701/207 |
| 2005/0004747 A1 * | 1/2005 | Abe ............................ | 701/200 |
| 2006/0293843 A1 * | 12/2006 | Morita et al. ............... | 701/207 |

FOREIGN PATENT DOCUMENTS

GB 2 11 733 A 7/1983

(Continued)

OTHER PUBLICATIONS

Examination Report issued from Great Britain Patent Office issued on Feb. 15, 2005 for the corresponding Great Britain patent application No. GB0408080.0 (a copy thereof).

(Continued)

*Primary Examiner*—Brian J Broadhead
(74) *Attorney, Agent, or Firm*—Posz Law Group, PLC

(57) ABSTRACT

A stop area is set in an arbitrary area where map matching processing is to be stopped, by an operation switch group or a remote controller. When a vehicle enters the stop area, the map matching processing is stopped, and when the vehicle exits from the stop area, the map matching processing is performed. It is supposed that a situation where the map matching processing should be performed has changed to a situation where the map matching processing should be stopped or vice versa. Here, since the stop area can be set in advance, it is not necessary to perform any selection operation. Thus, load on a driver during driving the vehicle can be reduced.

11 Claims, 5 Drawing Sheets

FOREIGN PATENT DOCUMENTS

| | | |
|---|---|---|
| JP | A-S58-70123 | 4/1983 |
| JP | A-S58-162809 | 7/1983 |
| JP | A-S64-21316 | 1/1989 |
| JP | A-H10-89979 | 4/1998 |
| JP | A-2000-074681 | 3/2000 |

OTHER PUBLICATIONS

Notice of Reason for Rejection from Japanese Patent Office issued on Jul. 18, 2006 for corresponding Japanese patent application No. 2003-104397 (a copy and English translation thereof).

* cited by examiner

| NO. | NAME | EDIT | DELETE | RELEASE AREA |
|---|---|---|---|---|
| 1 | ×× PARKING LOT | EDIT | DELETE | RELEASE AREA |
| 2 | AROUND ×× RIVER | EDIT | DELETE | RELEASE AREA |
| 3 | REGION OF DIFFERENT SHAPE | EDIT | DELETE | RELEASE AREA |
| ⋮ | ⋮ | ⋮ | ⋮ | ⋮ |

VEHICLE NAVIGATION APPARATUS FOR CONTROLLING MAP-MATCHING AREAS

CROSS REFERENCE TO RELATED APPLICATIONS

This application is based on and incorporates herein by reference Japanese Patent Application No. 2003-104397 filed on Apr. 8, 2003.

FIELD OF THE INVENTION

The present invention relates to a vehicle navigation apparatus.

BACKGROUND OF THE INVENTION

Conventionally, in a vehicle navigation apparatus, radio navigation and self-contained navigation are known as methods for measuring a vehicle current position. As represented by a global positioning system (GPS), the radio navigation is receiving information from a satellite or the like and calculating a vehicle current position (latitude and longitude) from the received information. The merit of the radio navigation is that the vehicle current position can be obtained as an absolute position while a radio wave is received. On the other hand, the demerit of the radio navigation is that a measurement position varies within a predetermined error range, and measurement of vehicle position cannot be performed in a tunnel or under an elevated road.

The self-contained navigation is calculating a vehicle current position by integrating a traveled distance calculated from a measurement signal from e.g. a vehicle speed sensor in accordance with a direction calculated from a direction sensor such as a gyro sensor or a geomagnetic sensor. The merit of the self-contained navigation is that the vehicle position can be always calculated without being influenced by environment. On the other hand, the demerit of the self-contained navigation is that the error of the sensor is accumulated and the error increases as the traveled distance increases. This is because the self position is obtained by integration of the traveled distance in accordance with direction.

Accordingly, a vehicle navigation apparatus to calculate a vehicle current position by hybrid navigation as a combination of the radio navigation and the self-contained navigation utilizing the merits of the both navigation systems is widely used. For example, as one example of the hybrid navigation, while a current position is calculated by the self-contained navigation, the current position is corrected based on latitude and longitude calculated by the radio navigation. This eliminates the influence of sensor error in the self-contained navigation.

Further, for more accurate current position calculation, map matching processing is widely adopted. The map matching processing is comparing latitude and longitude calculated by the hybrid navigation and a vehicle travel locus with road data stored in a map data base, thereby obtaining a more correct vehicle current position.

The principle of the map matching processing will be briefly described in accordance with FIGS. 7A, 7B and 7C. For example, all the roads connected to an intersection where a vehicle has arrived are selected as candidate roads with a possibility that the vehicle may pass through. In the example of FIG. 7A, roads a, b and c are selected as candidate roads. Note that a road existing outside a predetermined range with respect to latitude and longitude, as the reference, of output by the hybrid navigation is excluded from the candidate roads. The shape of each of the selected candidate roads is compared with the shape of the vehicle travel locus. A road with the highest correlativity is regarded as a road where the vehicle is traveling. The vehicle position is determined on the road. In the example of FIG. 7C, as the road b has the highest correlativity, it is considered that the vehicle is traveling on the road b, and the vehicle position is determined on the road b. This processing is performed by predetermined time or distance the vehicle traveled, and the vehicle position is always determined on a road.

As described above, the principle of the map matching processing is premised on vehicle's traveling a road. However, a vehicle does not always travel on a road. It may travel on an off-road area such as a dry riverbed or a mountainous area, a wide private property or a parking lot. In these cases, when map matching processing is performed, the vehicle position is erroneously determined on an adjacent road and an accurate vehicle position cannot be obtained. For this reason, a vehicle navigation apparatus described in Patent Document (JP-A-S58-162809), for example, is provided with a switch to select execution or stoppage of map matching processing. In a case where traveling on an off-road area, a parking lot or the like as described above is started, a vehicle driver can designate stoppage of map matching processing.

However, in the above-described conventional vehicle navigation apparatus, the selection is merely made between execution and stoppage of map matching processing. Accordingly, a switch operation must be performed every time a situation where the map matching processing should be executed is changed to a situation where the processing should be stopped, or vice versa. During vehicle traveling, the vehicle driver must perform the selection operation between the execution and stoppage of the map matching processing. Thus selection operation may become load on the driver.

SUMMARY OF THE INVENTION

The present invention has been made in view of the above-described points, and has its object to provide a vehicle navigation apparatus capable of selecting execution or stoppage of map matching processing while reducing load on a driver.

To achieve the above object, a vehicle navigation apparatus is provided with the following. A vehicle current position and a map around the vehicle current position can be displayed. Data on the vehicle current position can be measured. A travel locus of the vehicle can be calculated based on the measured data on the vehicle current position. Map matching processing can be performed by comparing a shape of each road in a stored map data with a shape of the calculated travel locus and estimating a travel road where the vehicle is traveling. A vehicle mark indicating the vehicle current position and the map around the vehicle current position can be displayed such that the vehicle current position exists on the estimated travel road. A stop area can be set in an arbitrary area in the map data. When the vehicle current position stands in the set stop area, the map matching processing can be stopped.

In this structure, a stop area can be set in an arbitrary area, and when the vehicle enters the stop area, the map matching processing is stopped. The stop area may be set in advance. Any operation for selection is thereby not required in a case where a situation where the map matching processing should be executed is changed to a situation where the map matching processing should be stopped, or vice versa. This can reduce the load on the driver driving the vehicle.

In another aspect of the present invention, a vehicle navigation apparatus is provided with the following. A vehicle current position and a map around the vehicle current position can be displayed. Data on the vehicle current position can be measured. A travel locus of the vehicle can be calculated based on the measured data on the vehicle current position. Map matching processing can be performed by comparing a shape of each road in a stored map data with a shape of the calculated travel locus and estimating a travel road where the vehicle is traveling. A vehicle mark indicating the vehicle current position and the map around the vehicle current position can be displayed such that the vehicle current position exists on the estimated travel road. Here, an execution area can be set in an arbitrary area in the map data. When the vehicle current position stands in the set execution area, the map matching processing can be enabled.

In this structure, an execution area can be set in an arbitrary area, and when the vehicle enters the execution area, the map matching processing can be performed. The execution area may be set in advance. Any operation for selection is thereby not required in a case where a situation where the map matching processing should be stopped is changed to a situation where the processing should be executed, or vice versa. This can reduce the load on the driver driving the vehicle.

BRIEF DESCRIPTION OF THE DRAWINGS

The above and other objects, features, and advantages of the present invention will become more apparent from the following detailed description made with reference to the accompanying drawings. In the drawings:

FIG. 5B shows a display example when map matching processing has been stopped;

DETAILED DESCRIPTION OF THE PREFERRED EMBODIMENTS

First Embodiment

Hereinbelow, a description will be made about a vehicle navigation apparatus according to a first embodiment of the present invention in accordance with the drawings.

Figure 1:
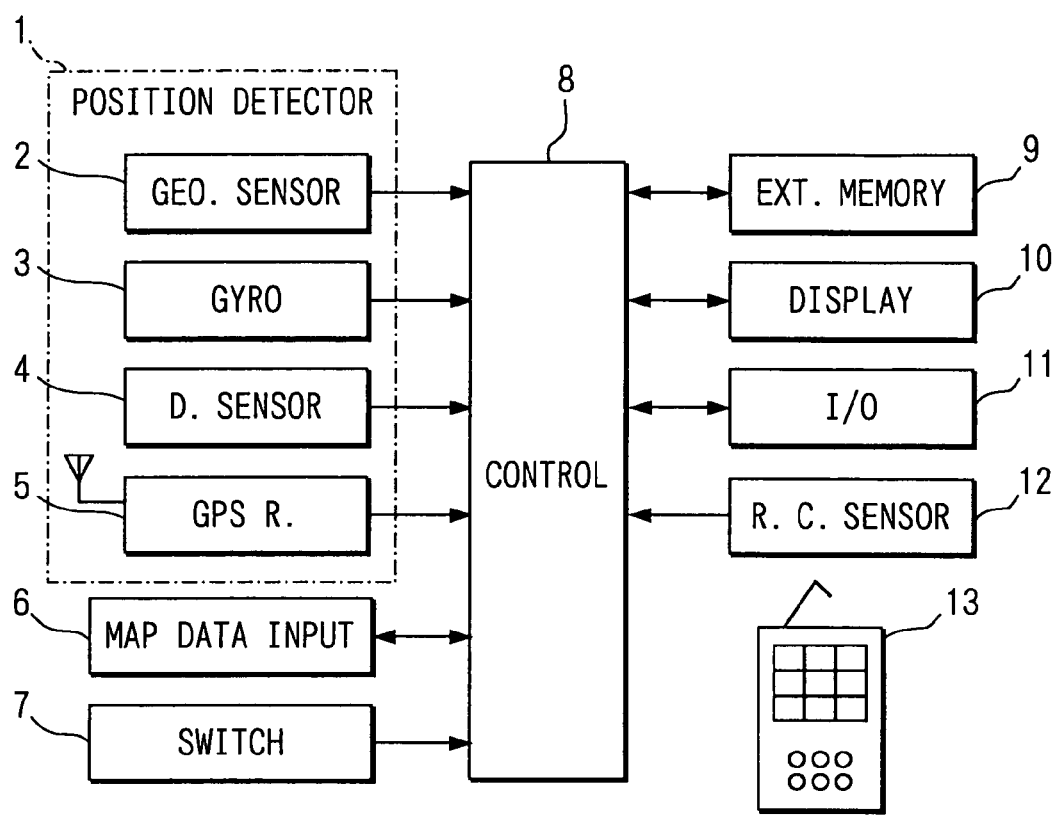
FIG. 1 is a block diagram showing a schematic construction of a vehicle navigation apparatus according to a first embodiment of the present invention.

FIG. 1 is a block diagram showing a schematic construction of the vehicle navigation apparatus according to the present embodiment. As shown in the figure, the vehicle navigation apparatus of the present embodiment has a position detector 1, a map data input unit 6, an operation switch group 7, a control circuit 8 to which these elements are connected, an external memory 9 connected to the control circuit 8, a display unit 10, an external information input/output unit 11, and a remote control sensor 12.

The control circuit 8 is a general computer including well-known CPU, ROM, RAM, I/O and bus line interconnecting these elements. Programs executed by the control circuit 8 are written in the ROM, and the CPU or the like performs predetermined calculation processing in accordance with the program.

The position detector 1 has well-known geomagnetic sensor 2, gyroscope 3, distance sensor 4, and GPS receiver 5 for GPS (Global Positioning System) for measurement of vehicle position based on a radio wave from a satellite. As these devices have errors of respectively different characteristics, they are used while the errors are supplemented with multiple sensors. That is, as described in the "Background of the Invention," data on a vehicle current position (latitude, longitude and travel locus) is measured by hybrid navigation as a combination of radio navigation by GPS and self-contained navigation by the geomagnetic sensor 2, gyroscope 3 and the distance sensor 4. Note that it may be arranged such that the position detector 1 has a part of the above-described elements in accordance with accuracy of respective sensors. Further, it may be arranged such that a steering rotation sensor, vehicle speed sensors for respective rotating wheels (not shown) may be used.

The map data input unit 6 inputs map data including road data, landmark data and character data. As a storage medium for storing the map data, a CD-ROM or DVD-ROM is generally used in accordance with the amount of data; however, a memory card, a hard disk or the like may be used.

Figure 2:
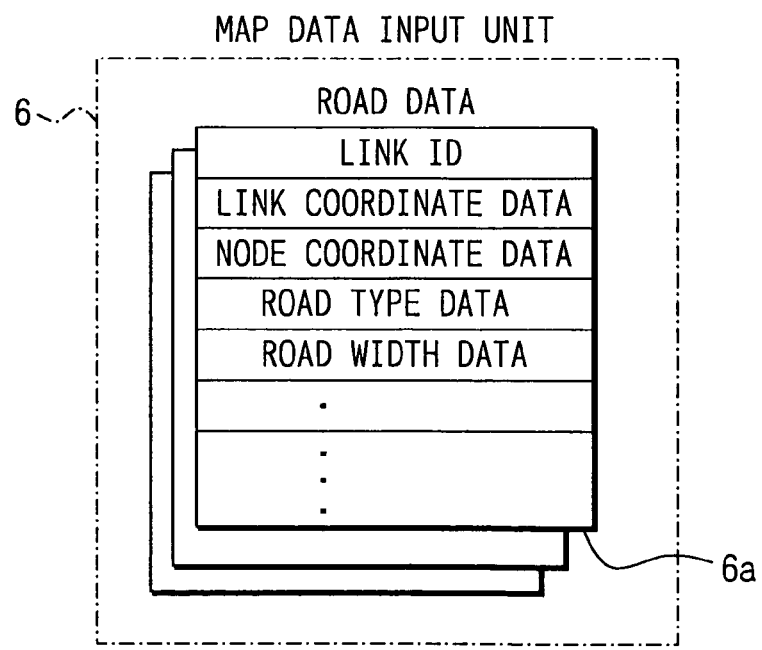
FIG. 2 is an explanatory diagram showing a data structure of road data in a map data input unit.

Next, the structure of the road data will be described with reference to FIG. 2. As shown in FIG. 2, road data 6a has respective data such as a link ID indicating a unique number for each road, link coordinate data, node coordinate data, road type data indicating a road type such as highway or national road, and road width data. Each road on the map is divided into multiple parts as nodes respectively indicating an intersection, a branch point and the like. The link in the road data 6a means a link between 2 nodes. As the link coordinate data, start end and termination end coordinates of the link are described. Note that in a case where a node is included in the link, node coordinates are described as the node coordinate data. The road data 6a is used for presenting the shape of road upon map matching processing or used upon search for a guided route to a destination as well as for map display.

The landmark data, although not shown, is data of place name, facility name, road name or the like linked with corresponding coordinates on the map. Note that as to a facility, data on telephone number, address and the like associated with the facility are also stored. The landmark data may be stored in the external memory 9 to be described later.

As the operation switch group 7, a touch switch or mechanical switch and the like integrated with the display unit 10 to be described later are employed, and used for various inputs.

The external memory 9 is a storage medium such as a memory card or a hard disk. Various data stored by a user such as text data, image data, voice data and the like are stored in the external memory 9.

The display unit 10 has, e.g., a liquid crystal display. A vehicle position mark corresponding to a vehicle current position, and a road map around the vehicle generated based on the map data inputted from the map data input unit 6, are displayed on the screen of the display unit 10. Further, in a case where a destination is set, a guided route from a current position to the destination can be superimposed on the road map.

The external information input/output unit 11 receives information such as road traffic information or the like, or transmits information from the vehicle side to the outside in accordance with necessity. The road traffic information or the like is delivered from a VICS center via beacons placed on roads or FM radio stations in various locations. The received information is processed by the control circuit 8, and, e.g., traffic jam information and/or traffic control information is superimposed on the road map displayed on the display unit 10.

Further, the vehicle navigation apparatus of the present embodiment has a so-called route guidance function. This route guidance function is to automatically select an optimum route from a current position to the destination and form and display a guided route, when a destination position is inputted from the remote control sensor 12 via a remote control terminal (hereinbelow, referred to as a "remote controller") 13 or from the operation switch group 7. As a method for automatically setting an optimum route, well-known Dijkstra method or the like is known. Further, the apparatus further has a search function of searching for the position of facility or the like from address, facility name, telephone number or the like.

Further, in the vehicle navigation apparatus of the present embodiment, a stop area and a release area can be set by the remote controller 13 or the operation switch group 7. The stop area is designated for stopping map matching processing in an arbitrary area on the map data. The release area is designated for releasing stoppage of map matching processing in the stop area. The stop area is set by, e.g., displaying a map including an area to be set as a stop area on the display unit 10, and designating the central position and size of the stop area on the displayed map, or designating a place name or facility name such as parking lot. The release area can also be set in a similar manner to that of stop area. In the case of release area, the area may be set by designating, e.g., a road name.

Figures 3, 4:
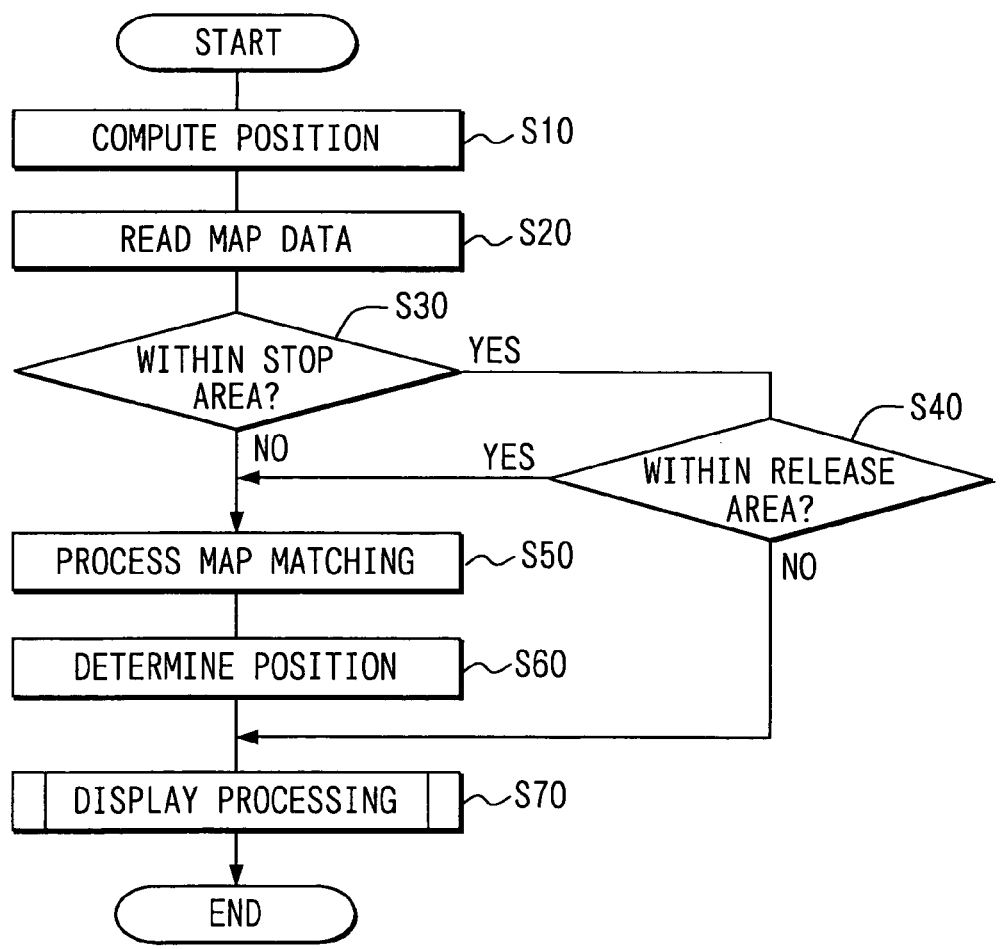
FIG. 3 is an explanatory diagram showing an example of a list display of preset stop areas.
FIG. 4 is a flowchart diagram showing a processing to select execution/stoppage of map matching processing when a vehicle position mark indicating a vehicle current position and a road map around the vehicle are displayed on a display unit, according to the first embodiment.

A name can be given to the stop area set as described above. In a case where the range and name of the stop area, and further, the release area are set, the range of the release area is also stored in the external memory 9. When a list display of stop areas is instructed by the remote controller 13 or the operation switch group 7, the names of all the stop areas stored in the external memory 9 are displayed in the form of list. FIG. 3 shows an example of the list display. As shown in FIG. 3, in the list display, names of stop areas are displayed with numbers in preset order. Further, in the list display, an editing switch to transit to an editing screen to edit the name, position and size of stop area, a deletion switch to delete a stop area, and a release area switch to display a release area, are displayed in correspondence with the respective stop areas.

In a case where the editing switch has been selected, a map including the name and the stop area is displayed. The name can be corrected, or the position or size of the stop area can be corrected on the displayed map. Further, in a case where the deletion switch has been selected, the stop area is deleted. Further, when the release area switch has been selected, a map including the release area is displayed, and the range of the release area can be corrected or deleted.

These functions are performed by various computation processings mainly by the control circuit 8. That is, when a destination has been inputted, the control circuit 8 calculates a route by using the map data from the map data input unit 6. Then, the control circuit 8 displays the route, and performs enlargement of road map or speech guidance in a branch point or an intersection to turn right/left. Further, the control circuit 8 displays a vehicle position mark indicating a vehicle position and a road map around the vehicle on the display unit 10, or changes the scale of the road map.

Next, as a feature of the present invention, processing for selecting execution or stoppage of map matching processing when a vehicle position mark indicating a vehicle current position and a road map around the vehicle are displayed on the display unit 10, will be described with reference to a flowchart of FIG. 4.

As shown in FIG. 4, first, a vehicle current position is calculated based on position data measured by the respective sensors of the position detector 1 (Step 10). At this time, position data by the GPS receiver 5 is obtained in the same form as the coordinate data (latitude and longitude) of the above-described road data. Further, data on a traveling direction and traveled distance of the vehicle are obtained by the geomagnetic sensor 2, the gyroscope 3 and the distance sensor 4. Then, coordinate data of the current position is calculated with past-calculated or established vehicle position as the reference (calculation of coordinate data by self-contained navigation).

Next, map data around the vehicle (landmark data and road data) is read based on the coordinates of the vehicle current position (Step 20). Further, it is determined based on the coordinates of the vehicle current position whether or not the vehicle current position stands within an above-described stop area (Step 30). When the vehicle current position stands within a stop area, it is further determined whether or not a release area is set in the stop area and whether or not the position stands in the release area (Step 40).

Figure 5A:
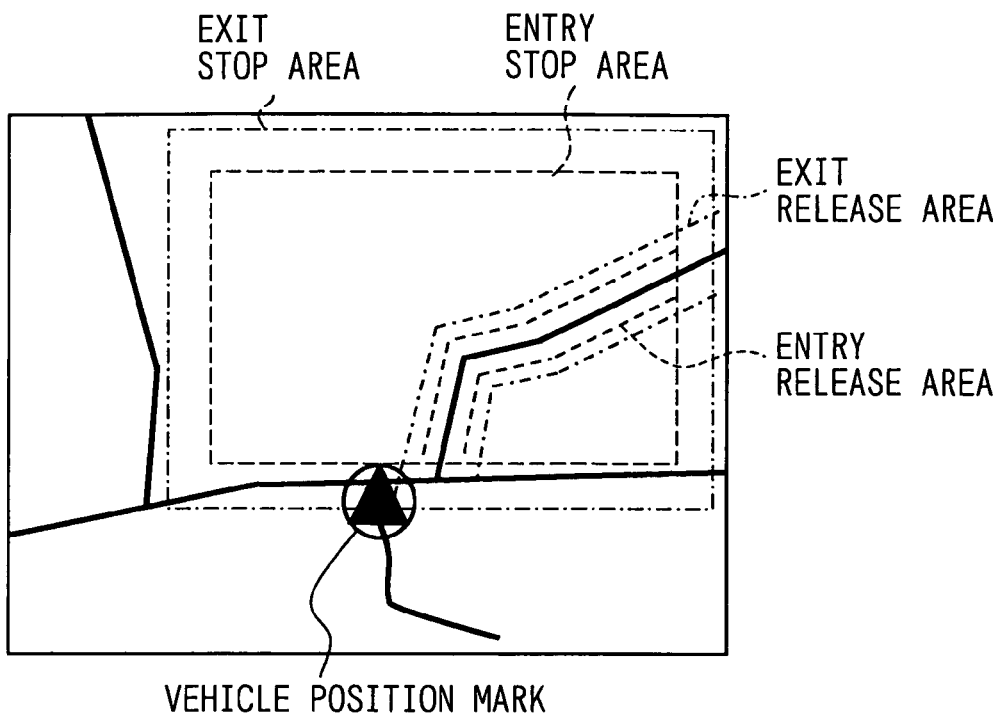
FIGS. 5A and 5B are display images of a vehicle position mark and a road map; especially.

Next, the stop area and the release area will be described. The stop area is set in an off road area such as a dry riverbed or mountainous area, an area out of road such as a parking lot or a private property, or an area having an actually-different road shape from road data due to construction of new road or the like. In such area, when a vehicle current position is placed on an adjacent road by map matching processing, an accurate current position cannot be displayed. For this reason, to stop map matching processing in such area, a stop area is set. As shown in FIG. 5A, the stop area has an entry stop area upon entry of vehicle into a stop area and an exit stop area upon exit of vehicle from the stop area. The entry stop area is used when the vehicle enters the stop area while the exit stop area is used when the vehicle exits from the stop area. These two types of stop areas are provided for prevention of frequent change of display of vehicle current position when the vehicle runs around a boundary of stop area. That is, the exit stop area includes the entry stop area, and covers a wider range than the entry stop area. Accordingly, the exit stop area around the entry stop area provides a hysteresis characteristic. When a vehicle once enters an entry stop area, map matching processing is stopped until the vehicle has been apparently out of the entry stop area.

Note that it is not necessary for the user himself/herself to set the two types of exit stop area and entry stop area. By setting an entry stop area, an exit stop area is set with the entry stop area as the reference. It goes without saying that the user may set an exit stop area and set an entry stop area with the exit stop area as the reference.

The release area is set within the stop area. In a case where a vehicle current position stands within the release area, the stoppage of map matching processing is released. For example, in a case where a stop area is set over a wide range in, e.g., a mountainous area, a road may exist through a part of the stop area. In an area where such road is provided, the accuracy of measurement of vehicle current position is improved by performing map matching processing. For this reason, in the present embodiment, a release area can be set to enable execution of map matching processing in a part of a stop area. The release area has an entry release area and an exit release area as in the case of the stop area.

As described above, as the stop area and the release area have different ranges upon entry and exit, it is determined in the determination processing at Step 30 and Step 40 whether or not the vehicle current position stands within or outside the respective areas with different ranges, with a state that the vehicle has entered/not entered the respective areas as the reference.

When it is determined at Step 30 that the vehicle current position is outside a stop area, or when it is determined at Step 40 that the vehicle current position is within a release area, map matching processing is performed (Step 50). In the map matching processing, a road with a possibility that the vehicle travels is specified based on the position data calculated by, e.g., GPS, and a travel locus is calculated from the position data calculated by self-contained navigation. Then, the shape of the travel locus is compared with the shape of the road with the possibility that the vehicle travels. A road with the highest correlativity is estimated as a road where the vehicle is traveling. Note that the calculation of travel locus may be performed based on the position data calculated by GPS, or may be performed by the combination of GPS position data and the position data by self-contained navigation. Further, in a case where a radio wave cannot be received from a satellite and position data by GPS cannot be calculated, map matching processing is performed based on the position data by self-contained navigation and a road where the vehicle is traveling is estimated.

When the road where the vehicle is traveling is estimated by map matching processing, the above-described shape of travel locus is applied to the road, thereby the vehicle current position is determined (Step 60). In this manner, when the vehicle current position has been determined, position data by self-contained navigation is calculated with the determined position as the reference.

On the other hand, at Step 40, when it is determined that the vehicle current position is outside the release area, the process proceeds to display processing at Step 70, without execution of the processing at Step 50 and Step 60, i.e., without execution of map matching processing. In this case, as the vehicle current position, the position data by self-contained navigation or the position data by GPS, i.e., the current position calculated at Step 10 is employed. Note that when the position data by GPS has been calculated, it is preferable that the position data by GPS is employed as the vehicle current position.

Figure 5B:
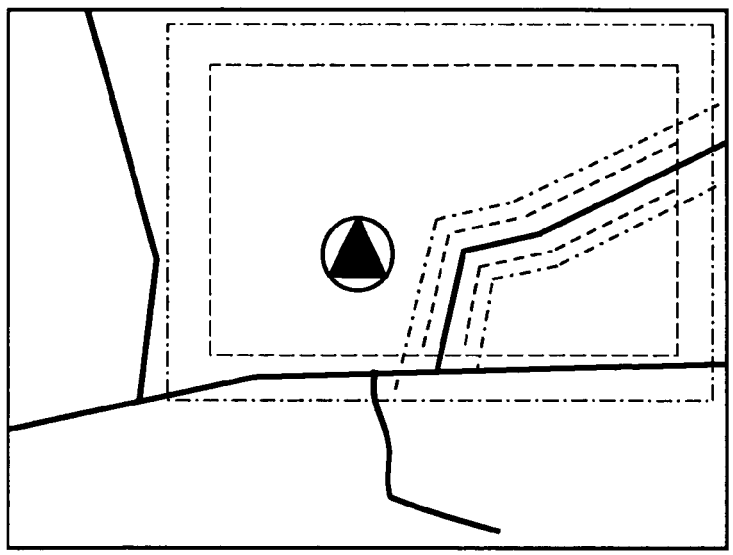

Then, the display processing is performed at Step 70 to display a road map around the vehicle on the display unit 10 while indicating a vehicle position mark in the current position determined at Step 60 or calculated at Step 10. In this arrangement, since map matching processing is performed outside a stop area or within a release area whereas map matching processing is stopped within a stop area, the vehicle current position can be displayed on the map with high accuracy. FIG. 5B shows an example of display of vehicle position mark and road map when the vehicle travels in a stop area. As shown in FIG. 5B, in the stop area, as map matching processing is stopped, erroneous placement of vehicle current position on an adjacent road can be prevented.

Especially, in the present embodiment, as the stop area and the release area are previously set, it is not necessary to perform a selection operation to select stoppage/execution of map matching processing during vehicle running. Accordingly, it is possible to appropriately select stoppage/execution of map matching processing while reducing load on a driver currently driving a vehicle.

Second Embodiment

Next, the vehicle navigation apparatus according to a second embodiment of the present invention will be described. Note that the vehicle navigation apparatus of the present embodiment has the same constituents as those of the vehicle navigation apparatus of the first embodiment, and the difference is the processing in the control circuit 8. Therefore, an explanation of the constituents will be omitted.

In the vehicle navigation apparatus of the present embodiment, the difference from the above-described first embodiment is that an execution mode to execute map matching processing and a stop mode to stop the map matching processing are provided selectably by a switch operation, and when the stop mode is set, an execution area to enable map matching processing is set. In this manner, a selection switch for selection of the map matching execution mode and the stop mode is provided, and an execution area to enable map matching processing is set in the stop mode. With this, the operation frequency of the selection switch during vehicle driving can be reduced in comparison with the conventional art. Accordingly, the load on the driver can be reduced.

Figure 6:
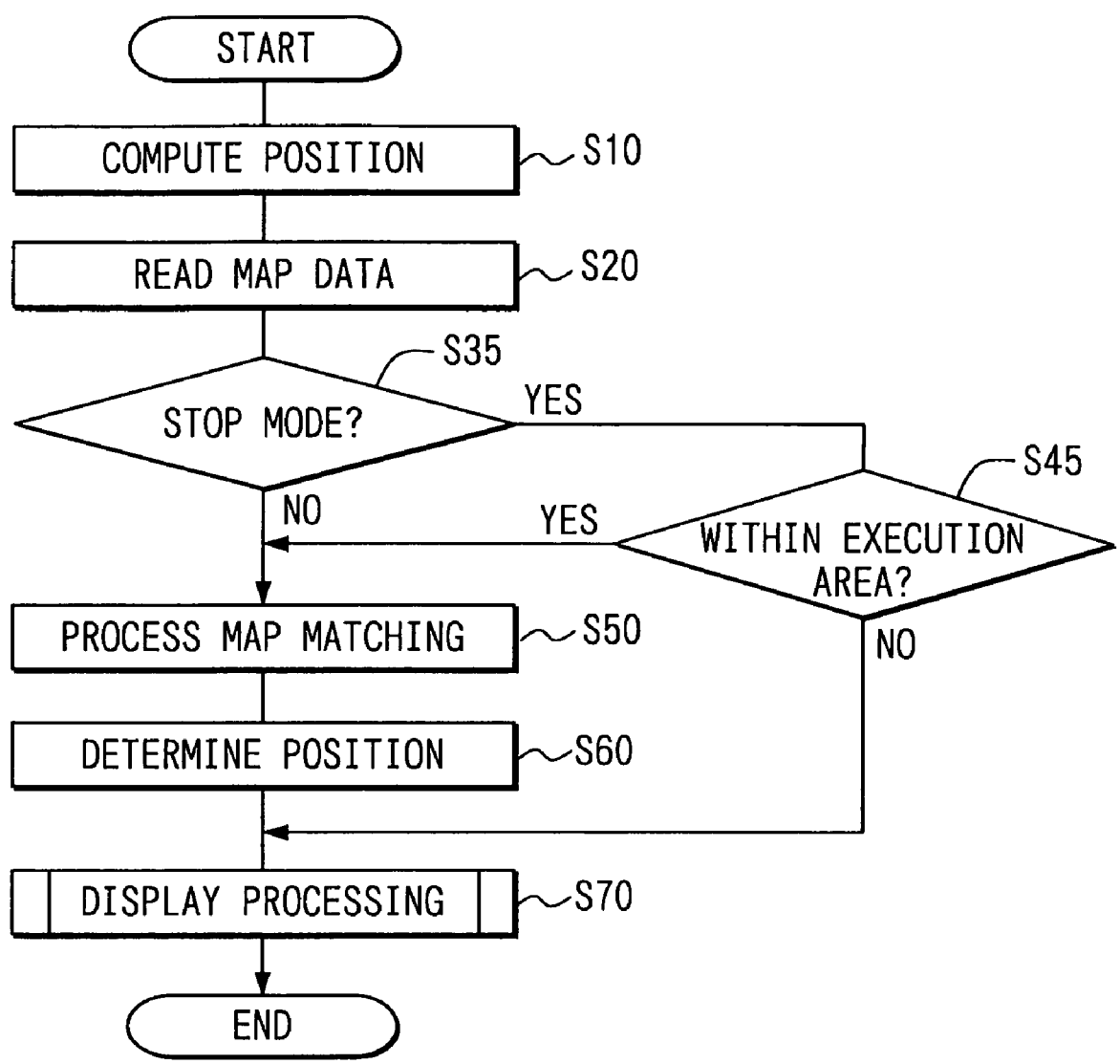
FIG. 6 is a flowchart diagram showing a processing to select execution/stoppage of map matching processing when a vehicle position mark indicating a vehicle current position and a road map around the vehicle are displayed on the display unit, according to a second embodiment of the present invention.
Figure 7A:
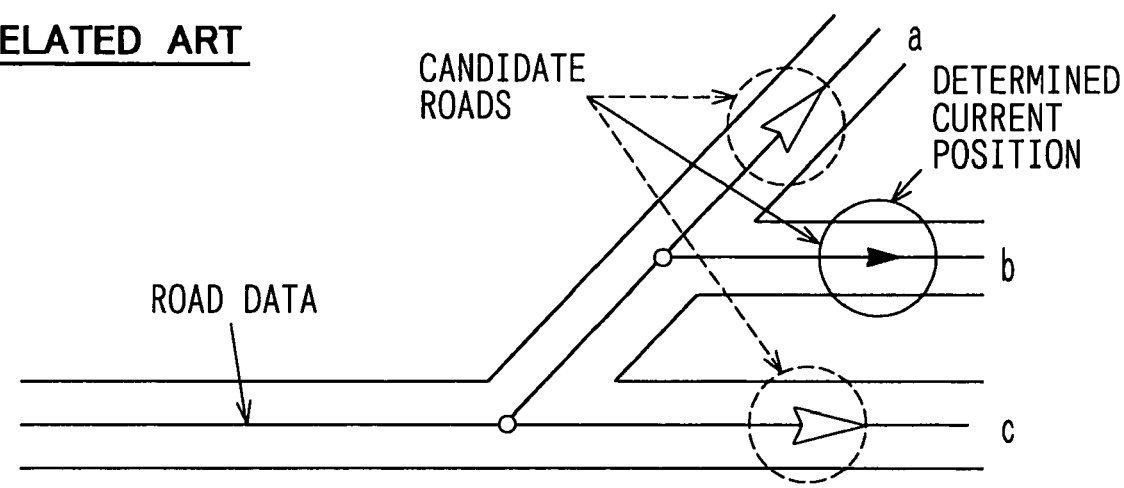
FIGS. 7A, 7B and 7C are explanatory diagrams for explaining a principle of map matching processing of a related art.
Figure 7B:
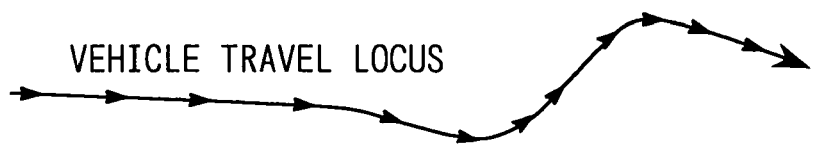
Figure 7C:
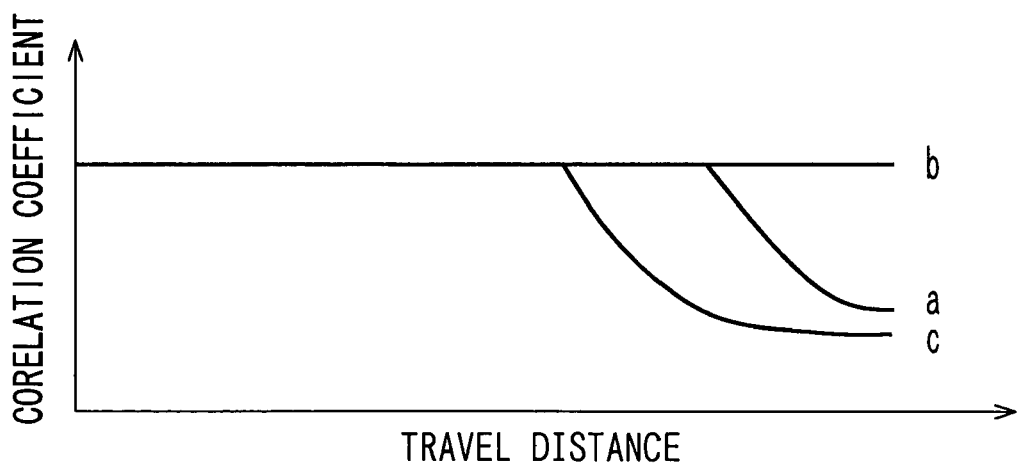

Processing for selection of stoppage/execution of map matching processing according to the present embodiment is shown in a flowchart of FIG. 6. In FIG. 6, processing at Step 10 and Step 20 is the same as the processing at Step 10 and Step 20 in the flowchart of FIG. 4.

In the present embodiment, at Step 35, it is determined whether or not the map matching processing stop mode has set by the operation switch group 7 or a selection switch provided on the remote controller 13. At this time, when the map matching processing stop mode has not been set, i.e., when the map matching processing execution mode is set, the process proceeds to processing at Step 50 to Step 70. The processing at Step 50 to Step 70 is the same as the processing at Step 50 to Step 70 in the flowchart of FIG. 4. A road where the vehicle is traveling is estimated by map matching processing, and the vehicle current position is displayed on the road.

On the other hand, when it is determined at Step 35 that the stop mode has been set, it is further determined whether or not the vehicle current position stands within an execution area (Step 45). When it is determined that the vehicle current position stands within an execution area, the process proceeds to Step 50, at which map matching processing is performed. On the other hand, when it is determined that the vehicle current position stands outside an execution area, the process proceeds to the display processing at Step 70 without execution of the map matching processing at Step 50. Accordingly, in this case, the vehicle position mark is displayed in the current position calculated at Step 10.

Here, the execution area is set in a similar manner to that of the stop area of the first embodiment and stored in the external memory 9. For instance, the execution area has an entry execution area upon entry of vehicle into an execution area and an exit execution area upon exit of vehicle from the execution area. The entry execution area is used when the vehicle enters the execution area while the exit execution area is used when the vehicle exits from the execution area.

In the second embodiment as described above, when the map matching stop mode has been set by the selection switch, in a case where the vehicle enters an area to execute map matching processing, the map matching processing is automatically performed by previously setting the area as an execution area. Accordingly, the frequency of selection operation by the driver can be reduced.

Note that the present invention is not limited to the above-described embodiments, but various modifications can be made within a scope not departing from the subject matter of the present invention.

For example, in the above-described second embodiment, the selection switch to select the map matching processing execution mode or the map matching stop mode is provided; however, the selection switch may be omitted. That is, it may be arranged such that the vehicle navigation apparatus displays a vehicle current position without performing map matching processing in normal times, and performs map matching processing only in a preset execution area.

The stop area, release area and execution area in the above-described respective embodiments are continuously stored unless they are deleted by the user. However, for example, it may be arranged such that a memory for storing information of these areas is added temporarily during a period from vehicle ignition-on to ignition-off. In this manner, in a case where an area is temporarily stored, various areas in frequently-visited places are continuously stored, whereas various areas in seldom-visited places are temporarily stored. Thus operability can be improved.

It will be obvious to those skilled in the art that various changes may be made in the above-described embodiments of the present invention. However, the scope of the present invention should be determined by the following claims.

What is claimed is:

1. A vehicle navigation apparatus provided in a vehicle, comprising:
    a map data storage unit for storing map data;
    a display unit to display at least a vehicle current position and a map around the vehicle current position using the map data stored in the map data storage unit;
    a position data measurement unit for measuring data on the vehicle current position;
    a travel locus calculation unit for calculating a travel locus of the vehicle based on the data on the vehicle current position measured by the position data measurement unit;
    a map matching processing unit for performing a map matching processing by comparing a shape of each road in the map data stored in the map data storage unit with a shape of the travel locus calculated by the travel locus calculation unit and estimating a travel road where the vehicle is traveling;
    a display control unit for displaying a vehicle mark indicating the vehicle current position and the map around the vehicle current position on the display unit such that the vehicle current position exists on the travel road estimated by the map matching processing unit;
    a stop area setting unit for setting a stop area in an arbitrary area in the map data; and
    a stop unit for, when the vehicle current position stands in the stop area set by the stop area setting unit, stopping the map matching processing performed by the map matching processing unit.

2. The vehicle navigation apparatus of claim 1,
    wherein the stop area includes an entry stop area and an exit stop area,
    wherein the entry stop area is a stop area that is used when the vehicle enters the stop area while the exit stop area is a stop area that is used when the vehicle exits from the stop area, and
    wherein the exit stop area includes the entry stop area to cover a wider range than the entry stop area.

3. The vehicle navigation apparatus of claim 1,
    wherein the stop area setting unit is capable of setting a plurality of stop areas, and upon setting, arbitrary names are provided, and further wherein the vehicle navigation apparatus further comprises a stop area display control unit for displaying a list of the names of the set stop areas on the display unit.

4. The vehicle navigation apparatus of claim 3, further comprising:
    a stop area editing unit capable editing names, positions, and sizes of the stop areas.

5. The vehicle navigation apparatus of claim 1, further comprising:
    a stop area deletion unit for deleting the stop area set by the stop area setting unit.

6. The vehicle navigation apparatus of claim 1, further comprising:
    a release area setting unit for setting a release area to release stoppage of the map matching processing by the stop unit within the stop area set by the stop area setting unit.

7. A vehicle navigation apparatus provided in a vehicle, comprising:
    a map data storage unit for storing map data;
    a display unit to display at least a vehicle current position and a map around the vehicle current position using the map data stored in the map data storage unit;
    a position data measurement unit for measuring data on the vehicle current position;
    a travel locus calculation unit for calculating a travel locus of the vehicle based on the data on the vehicle current position measured by the position data measurement unit;
    a map matching processing unit for performing a map matching processing by comparing a shape of each road in the map data stored in the map data storage unit with a shape of the travel locus calculated by the travel locus calculation unit and estimating a travel road where the vehicle is traveling;

a display control unit for displaying a vehicle mark indicating the vehicle current position and the map around the vehicle current position on the display unit such that the vehicle current position exists on the travel road estimated by the map matching processing unit;

an execution area setting unit for setting an execution area in an arbitrary area in the map data; and an enable unit for, when the vehicle current position stands in the execution area set by the execution area setting unit, enabling the map matching processing performed by the map matching processing unit.

8. The vehicle navigation apparatus of claim 7, further comprising:

a selection unit for selecting a map matching processing execution mode for executing the map matching processing performed by the map matching processing unit or a map matching processing stop mode for stopping the map matching processing, wherein the execution area setting unit sets the execution area for executing the map matching processing in the map matching processing stop mode, and wherein, when the vehicle current position stands within the execution area, the enable unit enables the map matching processing performed by the map matching processing unit even in the map matching processing stop mode.

9. The vehicle navigation apparatus of claim 7, wherein the execution area includes an entry execution area and an exit execution area, wherein the entry execution area is an execution area that is used, when the vehicle enters the execution area while the exit execution area is an execution area that is used when the vehicle exits from the execution area, and wherein the exit execution area includes the entry execution area to cover a wider range than the entry execution area.

10. A switching method for stopping a map matching processing, to be used in a navigation apparatus provided in a vehicle, wherein the navigation apparatus includes a map data storage unit for storing map data, display unit to display at least a vehicle current position and a map around the vehicle current position using the map data stored in the map data storage unit, position data measurement unit for measuring data on the vehicle current position, a travel locus calculation unit for calculating a travel locus of the vehicle based on the data on the vehicle current position measured by the position data measurement unit, a map matching processing unit for performing the map matching processing by comparing a shape of each road in the map data stored in the map data storage unit with a shape of the travel locus calculated by the travel locus calculation unit and estimating a travel road where the vehicle is traveling, and a display control unit for displaying a vehicle mark indicating the vehicle current position and the map around the vehicle current position on the display unit such that the vehicle current position exists on the travel road estimated by the map matching processing unit, the switching method comprising steps of:

setting a stop area in an arbitrary area in the map data; and stopping the map matching processing performed by the map matching processing unit when the vehicle current position stands in the set stop area.

11. A switching method for enabling a map matching processing, to be used in a navigation apparatus provided in a vehicle, wherein the navigation apparatus includes a map data storage unit for storing map data, a display unit to display at least a vehicle current position and a map around the vehicle current position using the map data stored in the map data storage unit, a position data measurement unit for measuring data on the vehicle current position current position, a travel locus calculation unit for calculating a travel locus of the vehicle based on the data on the vehicle current position measured by the position data measurement unit, a map matching processing unit for performing the map matching processing by comparing a shape of each road in the map data stored in the map data storage unit with a shape of the travel locus calculated by the travel locus calculation unit and estimating a travel road where the vehicle is traveling, and a display control unit for displaying a vehicle mark indicating the vehicle current position and the map around the vehicle current position on the display unit such that the vehicle current position exists on the travel road estimated by the map matching processing unit, the switching method comprising steps of:

setting an execution area in an arbitrary area in the map data; and enabling the map matching processing performed by the map matching processing unit when the vehicle current position stands in the set execution area.

* * * * *